UNITED STATES PATENT OFFICE.

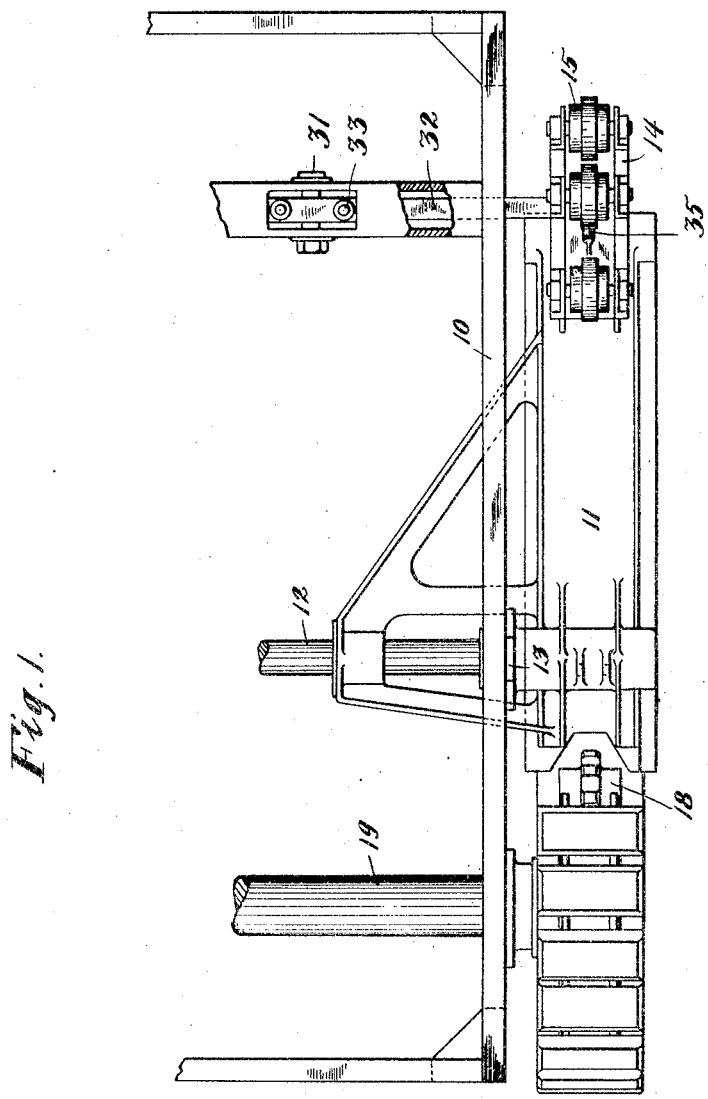

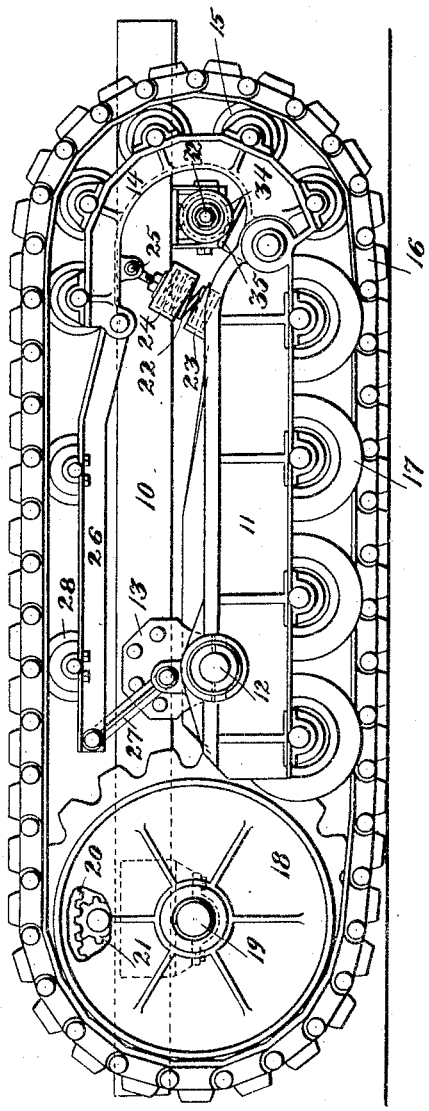

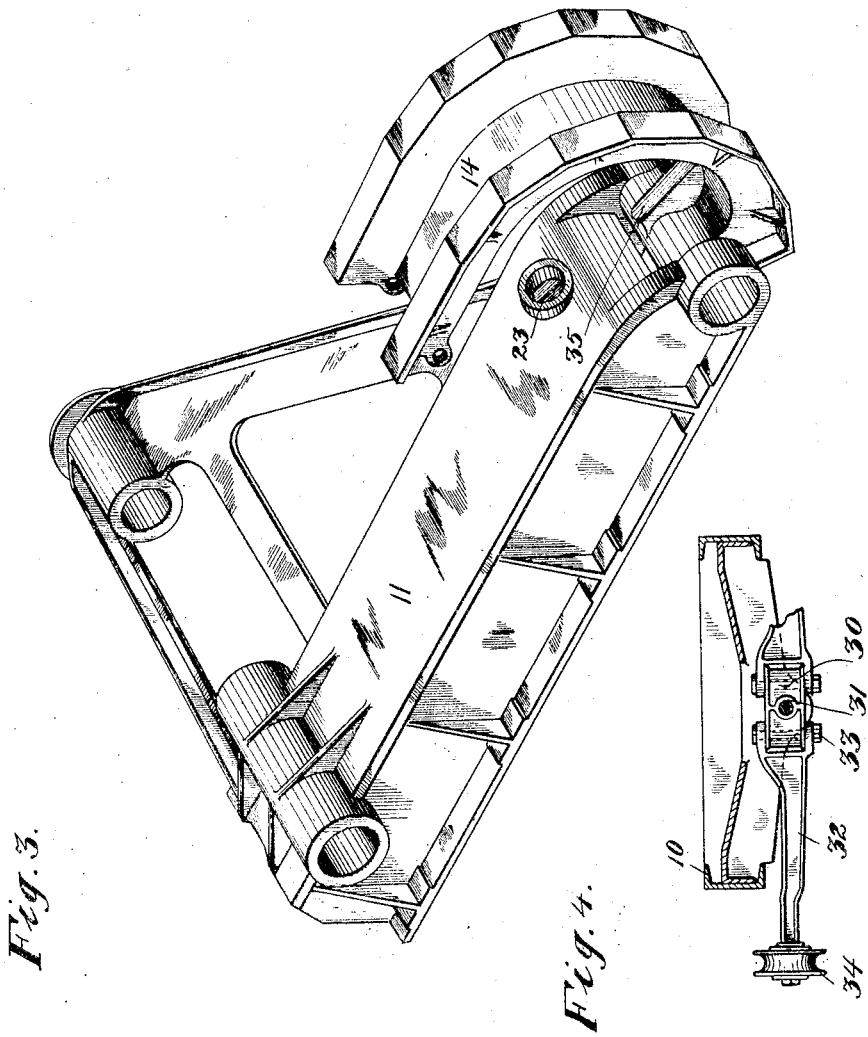

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR.

1,407,972.   Specification of Letters Patent.   Patented Feb. 28, 1922.

Application filed May 26, 1920. Serial No. 384,345.

*To all whom it may concern:*

Be it known that I, ELMER E. WICKERSHAM, a citizen of the United States, residing at Stockton, in the county of San Joaquin and State of California, have invented a new and useful Improvement in Tractors, of which the following is a specification.

This invention relates to tractors of the track laying type and has for its object to simplify and improve the construction and operation of the roller truck mechanism and the suspension for the main frame.

One form which my invention may assume is exemplified in the following description and illustrated in the accompanying drawings, in which—

Fig. 1 shows a partial plan view of the main frame and one of the track laying units at the side thereof.

Fig. 2 shows a side elevation of the tractor.

Fig. 3 shows a perspective view of the roller truck frame.

Fig. 4 shows a detail in section of the equalizer bar for supporting one end of the main frame upon the opposite roller truck mechanisms.

Referring more in detail to the accompanying drawings, I show a main frame 10 at each side of which is a track laying unit, each unit including a roller truck frame 11 pivoted near its rear end to the main frame by means of an axle 12, said axle being mounted on hangers 13 secured to the main frame. Hinged at the forward end of each roller truck frame 11 is a curved guide member 14 which carries rollers 15 on its periphery for guiding the forward flight of the endless chain track 16. Supporting rollers 17 are journaled on each truck frame 11 and operate upon the ground run of the chain track. A sprocket driving wheel 18 is arranged at the rear end of the frame on an axle 19 and is driven in any suitable way. In the present instance, I show each sprocket wheel as having an internal gear 20 with which meshes a driving pinion 21.

The upper end of the curved guide member is supported upon the truck frame by a coil spring 22 resting in a seat 23 on top of the truck frame and receiving a cup-shaped member 24 which has a pivotal connection 25 with the free end of the curved guide member. A rail 26 is pivoted to the free end of the curved guide member and extends rearwardly where it has a link connection 27 with the truck roller 11. This rail carries rollers 28 to support the upper run of the chain track.

The forward end of the main frame is supported upon opposite truck mechanisms by means of an equalizer bar which comprises a central member 30 pivoted to the main frame by a fore and aft extending pin 31, and an arm 32 pivoted to each end of said central member 30 by means of a vertical pin 33, each of said arms 32 carrying at its outer end a grooved roller 34 which rests upon a forwardly and downwardly inclined rail 35 formed on the curved guide member 14.

The above described mechanism provides a simple and economical arrangement wherein the usual idler wheel or sprocket wheel at the forward end of the track is replaced by the curved member 14. The spring 22 which supports the free end of said curved member will permit the latter to yield sufficiently to produce slack in the track in event an obstruction should become lodged between the track and its driving sprocket wheel. Also this spring will insure that the track will be kept properly tensioned at all times. The equalizer bar disclosed herein with its pivotal and rolling connections will afford all necessary freedom of movement between the main frame and each truck mechanism to permit the latter to rise and fall independently about their rear pivotal connections with the main frame.

Various changes in the construction and arrangement of the several parts may be employed without departing from the spirit of my invention as disclosed in the appended claims.

Having thus described my invention, what I claim and desire to secure by Letters Patent is:

1. In a vehicle of the self-laying track type, a main frame, a truck mechanism at each side thereof, comprising a truck frame pivotally connected at one end to the main frame for rocking movement in a vertical plane, and an equalizer bar for supporting one end of the main frame on the opposite truck mechanisms, said equalizer bar being pivoted to the main frame at its center, and a roller on each end of the bar riding upon the adjacent truck frame.

2. In a vehicle of the self-laying track type, a main frame, a truck mechanism at each side thereof, comprising a truck frame pivotally connected at one end to the main frame for rocking movement in a vertical plane, an equalizer bar for supporting one end of the main frame on the opposite truck mechanisms, said equalizer bar being pivoted to the main frame at its center, a roller on each end of the bar riding upon the adjacent truck frame, and a curved guide for the roller hinged to the truck frame and carrying rollers to guide the forward flight of the track.

3. In a vehicle of the self-laying track type, a main frame, a truck mechanism at each side thereof, comprising a truck frame pivotally connected at one end to the main frame for rocking movement in a vertical plane, an equalizer bar for supporting one end of the main frame on the opposite truck mechanisms, said equalizer bar being pivoted to the main frame at its center, a roller on each end of the bar riding upon the adjacent truck frame, a curved guide for the roller hinged to the truck frame and carrying rollers to guide the forward flight of the track, and a spring between the truck frame and the free end of the guide member for yieldingly supporting the latter.

4. In a vehicle, a main frame, a truck mechanism at each side pivoted at one end of the main frame and a jointed equalizer bar between opposite ends of the truck mechanisms supporting the main frame at one point, said equalizer comprising a central member pivoted to the main frame on a horizontally extending fore and aft pivot, and an arm pivoted to each end of the central member on a vertical pivot, and a loose connection between the outer end of each arm and the adjacent truck mechanism.

5. A tractor truck mechanism comprising an endless track, a roller truck frame operating upon the ground run of the track, a curved member hinged to the forward end of the truck frame, and rollers on said hinged member to guide the forward flight of the track.

6. A tractor truck mechanism comprising an endless track, a roller truck frame operating upon the ground run of the track, a curved member hinged to the forward end of the truck frame, rollers on said hinged member to guide the forward flight of the track, and a spring between the free end of the hinged member and the roller truck frame for yieldingly maintaining the curved member in engagement with the track.

In testimony whereof I have hereunto set my hand in the presence of two subscribing witnesses.

ELMER E. WICKERSHAM.

Witnesses:
W. W. HEALEY,
JOHN H. HERRING.